2,885,386

PHENOLIC RESIN VARNISH AND METHOD OF MAKING THE SAME

Cyril J. Straka and William C. Weltman, Pittsburgh, Pa., assignors to Westinghouse Electric Corporation, East Pittsburgh, Pa., a corporation of Pennsylvania No Drawing. Application August 26, 1954
Serial No. 452,468

5 Claims. (Cl. 260—57)

This invention relates to a phenolic resin varnish and a method of making the same.

The phenolic condensation products prepared by reacting phenols and aldehydes always contain a certain amount of unreacted phenol and aldehyde and polymeric materials of low molecular weight. These unreacted ingredients and low molecular weight materials are volatile by nature and are thus given off during molding operations in which the condensation product is used.

An object of this invention is to provide a method of producing a phenolic resin varnish in which phenol is reacted with formaldehyde in a novel two stage reaction whereby a higher yield of resin containing a negligible amount of unreacted ingredients and polymeric material of low molecular weight is obtained.

Other objects of the invention will, in part, be obvious and will, in part, appear hereinafter.

For a fuller understanding of the nature and objects of the invention, reference should be had to the following detailed description.

We have discovered a novel method of reacting phenol and formaldehyde which will produce a higher yield of desired thermosettable resinous reaction product than by conventional methods in which the same amount of raw materials are used. The novel method of this invention utilizes a two stage reaction of formaldehyde with phenol.

In the first stage of the reaction, less than enough formaldehyde required to completely react with all the phenol is used. A suitable ratio is from 0.4 to 0.85 mol of formaldehyde per mol of phenol. The reaction is carried out in a closed reaction vessel, under reflux conditions, in the presence of an acid catalyst.

In the second stage of the reaction, a sufficient amount of formaldehyde is added to the reaction products of the first stage to provide a total ratio of from 1.0 to 1.25 mols of formaldehyde per mol of phenol. This second stage reaction is catalyzed by an alkaline catalyst. After the second stage reaction is completed, a suitable solvent is added to the final reaction products to produce a liquid phenolic resin varnish.

The acid catalyst used in this invention may be either hydrochloric acid, phosphoric or sulphuric acid, or mixtures of two or more, and is added in an amount of from about 0.1% to 0.4% by weight based on 100% of the acid, based on the weight of the phenol. Any suitable alkaline catalyst may be used in the second stage of the reaction, such, for example, as ammonia and salts thereof, or alkali metal oxides and hydroxides and alkaline earth metal oxides and hydroxides, such as calcium oxide, calcium hydroxide, sodium hydroxide, barium oxide, barium hydroxide, strontium hydroxide, sodium carbonate and trisodium phosphate. The alkaline catalyst is added in an amount from 0.25 to 1.0% by weight, based on the weight of the phenol.

The first and second stages of the reaction are carried out at a temperature of about 100° C., for example, in the range of from 85° C. to 115° C. The time of reaction in the first stage is from 15 to 60 minutes and the time for the second stage is from 30 to 90 minutes.

Any of the well known solvents may be added to the reaction products to produce a liquid phenolic resin varnish. Examples of such solvents are methyl alcohol, ethyl alcohol, benzene and toluol, and mixtures of two or more.

In the production of the type of phenol base resin varnish hereinbefore referred to, the base materials are phenols and formaldehyde, formaldehyde polymers such as paraformaldehyde, and other aldehydes as well known to those skilled in the art. A particularly satisfactory phenol for this purpose is the mixture of cresols and xylenols, commercially known as cresylic acid. Ordinary phenol and meta-para cresol have been used with success. However, other phenols may be used for preparing this varnish.

A 37% to 40% aqueous formaldehyde is particularly suitable for reaction with the cresylic acid, since it is a standard material available on the market. Formaldehyde base materials, such as the various polymers of formaldehyde and related substances, may be substituted for the 37% to 40% formaldehyde solution above indicated. The specific process hereinafter detailed will be described in reference to 37% to 40% formaldehyde solution, but substitution of these various other formaldehyde base materials will be obvious to those skilled in the art.

The following example is illustrative of the preparation of the phenolic resin varnish of this invention.

Example I

The following ingredients in parts by weight were introduced into a closed reaction vessel:

|  | Parts |
|---|---|
| Phenol | 600 |
| Formaldehyde (37%) | 400 |
| Sulfuric acid | 1.0 |

The above ingredients were reacted under reflux conditions for 45 minutes, the temperature being approximately 100° C. At the end of this time, 170 parts of 37% formaldehyde and 4.1 parts of calcium hydroxide were added to the reaction vessel. Reflux reaction was then continued for 45 minutes. At the end of this time, the water in the mixture was removed by heating under a vacuum of from 26 to 27 inches of mercury. The resin thickened as the temperature rose to 77° C. during evacuation. At this point, 170 parts of 95% of ethyl alcohol were added to form a phenolic resin varnish. This varnish had the following properties:

| | |
|---|---|
| Specific gravity | 1.109 |
| Viscosity, cp., at 25° C. | 1110 |
| Gel time at 153° C., minutes | 11.3 |
| Recoverable solids  percent | 64.4 |
| Yield  do | 93.8 |

The following example is illustrative of the preparation of a phenolic resin varnish by a conventional method.

Example II

The following ingredients, all parts being by weight, were introduced into a closed reaction vessel:

| | Parts |
|---|---|
| Phenol | 600 |
| Formaldehyde (37%) | 570 |
| Calcium hydroxide | 2.4 |

The above ingredients were reacted under reflux conditions for a period of time of 1½ hours. At the end of this time, the water of condensation formed was removed by heating under a vacuum of from 26 to 27 inches of mercury. The resin thickened as the temperature reached 103° C. during evacuation, and then 170 parts of ethyl alcohol were added to form a phenolic resin varnish. The varnish produced by this conventional method had the following properties:

| | |
|---|---|
| Specific gravity at 25° C. | 1.1205 |
| Viscosity, cp., at 25° C. | 166 |
| Gel time at 153° C, minutes | 11.8 |
| Recoverable solids _____percent__ | 56.2 |
| Yield _____do____ | 77.3 |

As may be seen by a comparison of the results of Examples I and II, the recoverable solids and yield produced by this invention are far superior to those produced by heretofore known conventional methods, there being an increase of 8.2% and 16.5%, respectively.

It is intended that all matter contained in the above disclosure shall be interpreted as illustrative and not in a limiting sense.

We claim as our invention:

1. In the method of producing a phenolic resin varnish, the steps comprising reacting in a closed reaction vessel, under reflux conditions, only a phenol and from 0.4 to 0.85 mol of formaldehyde per mol of phenol, the reaction being carried out in the presence of an acid catalyst for a period of time of from 15 to 60 minutes at a temperature of from 85° C. to 115° C., the acid catalyst being in an amount of from 0.1% to 0.4%, based on the weight of the phenol, and comprising an acid selected from at least one of the groups consisting of hydrochloric acid, sulfuric acid and phosphoric acid, thereafter adding to the contents of the reaction vessel a sufficient amount of formaldehyde to provide a total ratio of from 1.0 to 1.25 mols of formaldehyde per mol of phenol and an alkaline catalyst, the alkaline catalyst being present in an amount of from 0.25% to 1% of the weight of the phenol, continuing the reaction under reflux for a period of time of from 30 to 90 minutes, vacuum dehydrating the reaction product under a vacuum of at least 26 inches of mercury and heating the reaction product, and thereafter adding a solvent to the reaction product to provide a phenolic base resin varnish.

2. The method of claim 1 in which the alkaline catalyst is selected from the group consisting of alkali metal oxides and hydroxides and alkaline earth metal oxides and hydroxides.

3. The method of claim 1 in which the alkaline catalyst is ammonia.

4. In the method of producing a phenolic resin varnish, the steps comprising reacting in a closed reaction vessel, under reflux conditions, only a phenol and from 0.4 to 0.85 mol of formaldehyde per mol of phenol, the reaction being carried out in the presence of an acid catalyst selected from the group consisting of sulfuric acid, phosphoric acid, and hydrochloric acid in an amount of from about 0.1% to 0.4% by weight, based on the weight of the phenol, for a period of time of from 15 to 60 minutes at a temperature of about 100° C., thereafter adding to the contents of the reaction vessel a sufficient amount of formaldehyde to provide a total ratio of from 1.0 to 1.25 mols of formaldehyde per mol of phenol and an alkaline catalyst selected from the group consisting of alkali metal oxides and hydroxides and alkaline earth metal oxides and hydroxides in an amount of from about 0.25% to 1.0% by weight, based on the weight of the phenol, continuing the reaction by refluxing for a period of time of from 30 to 90 minutes, applying a vacuum at the end of the refluxing to remove water from the reaction product and thereafter adding a solvent to the reaction product to provide a phenolic base resin varnish.

5. A phenolic resin varnish having a negligible amount of unreacted ingredients and polymeric material of low molecular weight comprising the reaction product of only phenol and formaldehyde in the proportions of 1.0 mol of phenol and from 1.0 to 1.25 mols of formaldehyde, the reaction being carried out in two stages, the first stage comprising reacting the mol of phenol with from 0.4 to 0.85 mol of formaldehyde in a closed reaction vessel under reflux conditions for a period of time of from 15 to 60 minutes, the reaction being catalyzed by an acid selected from the group consisting of sulfuric acid, phosphoric acid and hydrochloric acid in an amount from about 0.1% to 0.4% by weight, based on the weight of the phenol, the second stage of the reaction comprising reacting with the reaction products of the first stage a sufficient amount of formaldehyde to provide a total of from 1.0 to 1.25 mols of formaldehyde per mol of the phenol by refluxing for a period of time of from 30 to 90 minutes, applying a vacuum at the end of the refluxing to remove water from the reaction product the reaction of the second stage being catalyzed by an alkaline catalyst selected from the group consisting of alkali metal oxides and hydroxides and alkaline earth metal oxides and hydroxides in an amount of from about 0.25% to 1.0% by weight, based on the weight of the phenol, and a solvent for the reaction products, the solvent and reaction products combined to produce a liquid phenolic resin varnish.

References Cited in the file of this patent

UNITED STATES PATENTS

| | | |
|---|---|---|
| 2,140,981 | Botty | Dec. 20, 1938 |
| 2,151,975 | Kline | Mar. 28, 1939 |
| 2,357,090 | D'Alelio | Aug. 29, 1944 |
| 2,400,718 | Siegel | May 21, 1946 |
| 2,473,145 | Hesselbart | June 14, 1949 |